April 2, 1957  W. G. REDMOND  2,787,746
AUXILIARY SERVO CONTROL HAND GRIP FOR A
MANUALLY OPERABLE CONTROL LEVER
Filed July 23, 1954  2 Sheets-Sheet 1

INVENTOR.
William G. Redmond
BY
William R. Robertson
AGENT

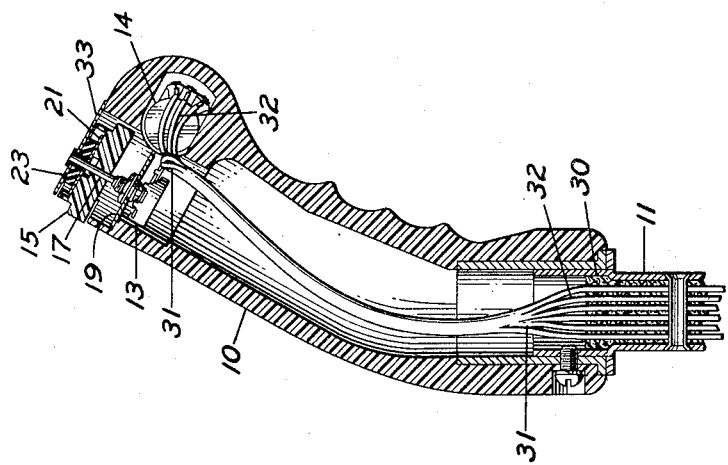
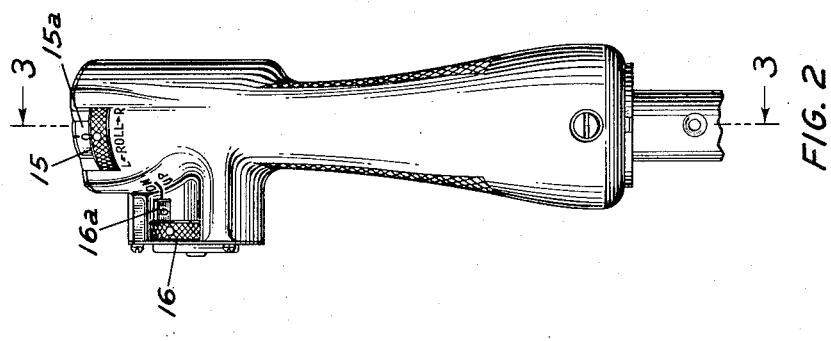
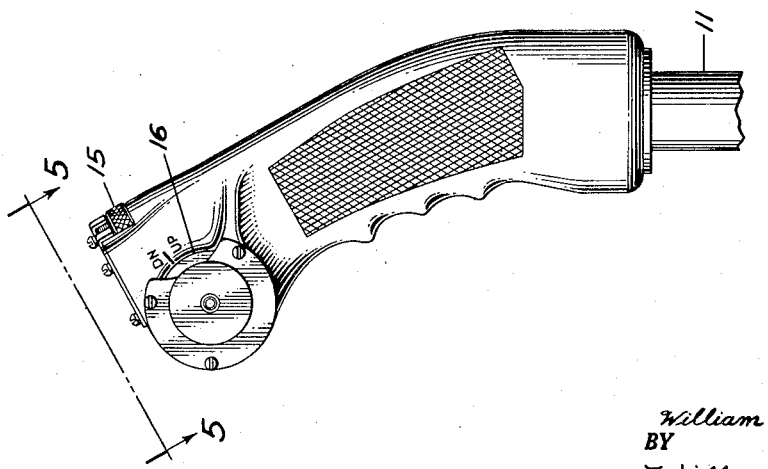

United States Patent Office 2,787,746
Patented Apr. 2, 1957

2,787,746

AUXILIARY SERVO CONTROL HAND GRIP FOR A MANUALLY OPERABLE CONTROL LEVER

William G. Redmond, Dallas, Tex., assignor to Chance Vought Aircraft, Incorporated, Dallas, Tex., a corporation of Delaware Application July 23, 1954, Serial No. 445,213

9 Claims. (Cl. 318—19)

The present invention pertains to a control device which governs the extent of actuation of a multiplicity of controlled elements. More specifically, this invention relates to an auxiliary control hand grip device for a control lever whereby in addition to the control provided by the control lever, a second vernier control is provided by the hand grip device.

This invention is somewhat similar in appearance to the lever hand grip disclosed in U. S. Patent No. 2,543,450 issued February 27, 1951. In all other respects my invention, as disclosed hereinafter is shown to be an improved, new, and useful hand grip device.

My invention is particularly suitable for use with a mechanism which may be controlled and operated by the selective manipulation of both levers and electrical controls as would be the case in governing the major and minor movements of a steam shovel, or of the major and minor movements of the control surfaces of aircraft. For simplicity, I will illustrate my auxiliary control device as it may be used on an aircraft.

Briefly, the conventional aircraft is controlled by a pilot-operated control lever or wheel about two of the principal axes of the aircraft, the longitudinal axis for roll control and the transverse axis for pitch control. For purposes of simplifying the control of aircraft, the control lever or wheel preferably is mounted in such a manner as to cause the aircraft to move in the direction of movement of the control lever. Actuation of the control surfaces may be accomplished by servo-motors governed by the major control lever. To balance the controls, i. e., to vary the attitude of an individual control surface in order to vary the lift produced thereby due to changing of loads in the aircraft, or due to changing of flight attitudes of the aircraft, trim tabs on the control surfaces are necessary, or trimming of the aircraft can be accomplished by minor deflections of the entire control surface without having trim tabs.

Previously, trim control levers or wheels have been placed at various locations around the pilot, as on the floor, on either or both sides of the pilot or on the cabin ceiling above the pilot. Thus, the pilot has been required to move one hand from the throttle control to a trim control lever or he has been required to change hands on the control stick and move the hand which was operating the control stick to the trim control lever. This moving of the hands about in the cockpit for the necessary trimming of the aircraft control surfaces is time-taking and requires more of the pilot's attention inside the cockpit than outside the cockpit, which, during trimming operations, leaves the control of the aircraft in a precarious or dangerous condition. As applied to an aircraft control system wherein a major control lever governs a pair of control surfaces through actuators or servomotors and control surface actuator levers, my auxiliary control device may be used on the major control lever to provide an auxiliary and fine control of the control surfaces.

A principal object of this invention is to provide an improved fine control of the actuator levers governed by the major control lever.

Another object of this invention is to provide an improved, auxiliary, fine control, hand grip device for a manually operable control lever in such a fashion that the operator may actuate the auxiliary control device with the same hand that he operates the control lever. Therefore the operator is not distracted while locating and operating the auxiliary control.

A still further object of this invention is to provide an auxiliary control device in the shape of a hand grip for a major control lever in which the exact setting or amount of vernier adjustment put in the control system by the auxiliary device is always clearly and visably indicated on the hand grip.

Yet another object of this invention is to provide a new auxiliary control device which is more efficient, lighter in weight, more dependable, and more convenient and simpler for the operator to learn and operate.

Another object of this invention is to provide a new auxiliary control device which may be used by the operator solely for operating the actuator levers normally operated by the control lever.

Other objects and advantages will be apparent from the specification and claims, and from the accompanying drawings which illustrate an embodiment of the invention.

In the drawings:

Fig. 2 is a front view of the auxiliary control hand grip or the portion of the hand grip facing the operator of the control lever on which the hand grip may be mounted;

Fig. 3 is a sectional view taken on sectional line 3—3 on Fig. 2;

Fig. 4 is a side view of the hand grip shown in Fig. 2;

Figure 5:
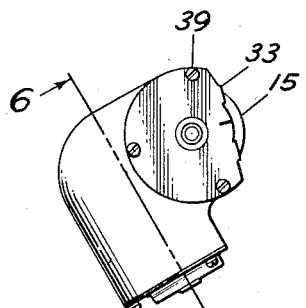
Fig. 5 is a view taken in the direction of arrows 5—5 on Fig. 4.
Figure 6:
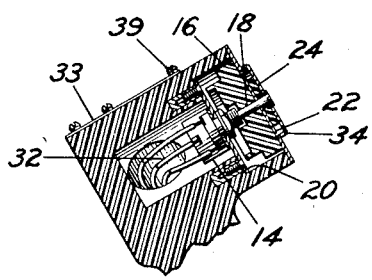
Fig. 6 is a sectional view taken on sectional line 6—6 on Fig. 5.

The present invention relates to an auxiliary control hand grip device having a casing 10 for a manually operable lever mechanism 12. Again for simplicity, I will describe my auxiliary control device as it may be used on an aircraft. The device may be a part of a servo trim system whereby a craft may be maneuvered without calling on the major controls, thus leaving the latter free to respond to only the functions of the course change and attitude change for which they were designed.

The device consists of an auxiliary control hand grip 10, Figs. 1–6, having a casing or housing constructed of any suitable material, but preferably of a hollow, molded plastic material. An adapter 11 is provided for attachment of the hand grip to a conventional major control lever 12, or control stick column. The novel hand grip 10, when included in the conventional pilot's stick or control wheel, incorporates into the control stick grip a potentiometer 13 for proportional control of the airplane's trim about its roll axis.

Inside the casing of hand grip 10 the linear carbon potentiometer 13 is mounted on a plate 19 which is secured in any suitable fashion to the stick grip body, and potentiometer 13 is used as the input control signal for a closed-loop type of control system as will be hereinafter described. While other types of potentiometers may be used, I have found this type to be the most satisfactory. A shaft 17 extends upwardly from potentiometer 13 towards the top of stick grip 10. Rigidly mounted on shaft 17, for manipulation by the operator, is a control wheel knob 15, Figs. 1, 3, and 5. Also mounted on shaft 17 above knob 15 is a spacer washer 21, and rubber washer 23, these parts being kept in place by cover plate 33 secured to the top surface of grip 10 by screws 39. The proper or desired torque for turning of the wheel knob 15 is obtained by the addition of washers as required, to vary the friction between wheel knob 15 and cover plate 33. Electrical leads 31, Fig. 7, extend from potentiometer 13 to the electrical servomotor or fine trim control closed loop system hereinafter described.

Figure 1:
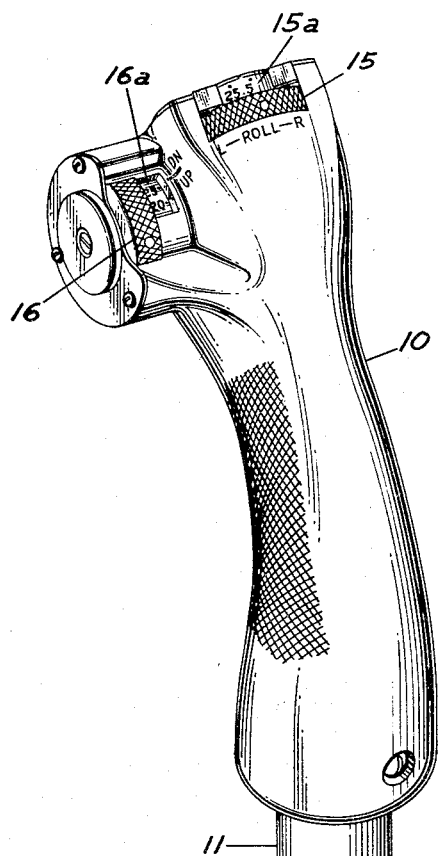
Fig. 1 is a perspective view of the auxiliary control hand grip as would appear when mounted on a manually operable lever mechanism showing the two auxiliary control knobs rotatable, in aircraft for example, in the direction of control desired, i. e., for roll control and for pitch control.

It will be understood that a portion of wheel knob 15 projects through a cut-out portion of grip 10, exposing a knurled surface which can be manipulated by the pilot's thumb while his hand grasps the grip 10. As viewed in Figs. 1 and 2, for convenience of the operator in this illustrative example, control wheel knob 15 is positioned for rotation in a substantially horizontal plane in the casing of hand grip 10 adjacent the top thereof. Minor control wheel knob 15 may, as in our example, be used as the fine roll control wheel knob. As shown in Figs. 1 and 2, attached to the top of wheel knob 15 or formed as an integral part thereof is a reduced diameter portion 15a calibrated to indicate various trim positions. This calibrated portion 15a is visible to the operator through a suitable cutout in the back and upper portion of casing 10 facing the operator.

The novel hand grip 10 incorporates another potentiometer 14 into the control lever or control wheel for proportional trim control of the aircraft about its pitch axis. The potentiometer 14, Fig. 6, mounted on plate 20, is used as the input control signal in a second closed-loop type of control system as will be hereinafter described. Likewise, a shaft 18 extends as viewed in Fig. 6, from potentiometer 14 toward the side of stick grip 10, at substantially right angles to shaft 17 of the first described potentiometer 13. Control wheel knob 16, for manipulation by the operator for trim control about the pitch axis, is rigidly mounted on shaft 18 in a similar fashion and adjacent to the roll trim wheel knob 15, but in a transverse manner thereto. Also mounted on shaft 18 above wheel knob 16 is washer 22 and rubber washer 24 held in place by cover plate 34. As shown in Figs. 1 and 2, control wheel knob 16 is positioned for rotation in a substantially vertical plane in the casing of hand grip 10 adjacent the top thereof and exposes a knurled surface portion through a cut-out portion in grip 10. Minor control wheel knob 16 is used as the fine pitch control wheel knob. As shown in Figs. 1 and 2, attached to the side of wheel knob 16 or formed as an integral part thereof is a reduced diameter portion 16a calibrated to indicate various trim positions. Likewise, this calibrated portion 16a is visible to the operator through a suitable cut-out in the back and upper portion of casing 10 facing the operator.

Figure 7:
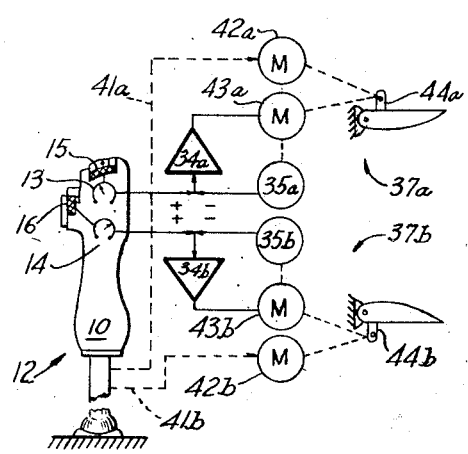
Fig. 7 is a circuit diagram showing how the signal input of the potentiometers in the hand grip may provide an auxiliary control for the actuator levers that is controlled by the major lever.

The major control lever 12, Figs. 1 and 7, governs the movements of the mechanism to be controlled, which in my case, for illustrative purposes only, is the power output or actuator units 37a and 37b comprising main control system hydraulic servomotors 42a and 42b, respectively, for operating actuator levers 44a and 44b, respectively, this much of the system being similar to that disclosed in assignee's U. S. Patent No. 2,685,422. It will be understood that operative connections 41a and 41b exist between the control lever 12 and the servomotors 42a and 42b, respectively, as well as connections between the servomotors and their respective actuator levers 44a and 44b. The actuator units 37a and 37b, both additionally include auxiliary fine control servomotors 43a and 43b governed by the input potentiometers, 13 and 14, respectively. It will also be understood, that in the actuator unit 37a, a single servomotor may be included in place of the two servomotors 42a and 43a, illustrated. Likewise if so desired, one servomotor may be utilized for servomotors 42b and 43b. Actuator units 37a and 37b move or control the movement of other bodies, such as, in my illustrative example, the actuator levers 44a and 44b, respectively, and which levers are connected to the control surfaces of an aircraft for deflection of the same, as control surfaces 45a and 45b.

The auxiliary, or vernier control mechanisms 13, 34a, 35a, 43a, and 14, 34b, 35b, and 43b of this invention provide an additional and independent control of the actuator levers 44a and 44b of actuator unit 37a and 37b, respectively, that is more precise than the conventional control of the actuator levers provided by the major control lever 12 through elements 12, 41a, 42a, 41b and 42b. Accordingly, vernier, or fine movements of the control surfaces for purposes of trimming are obtained by providing a fine or small adjustment of the controlling power output or actuator units 37a and 37b. These trimming or minor movements are governed by my signal input potentiometers in the hand grip.

Since the circuit diagram for each of the auxiliary or fine trim control circuits is similar, only one circuit for one side of aircraft, for example, is illustrated. Fig. 7 illustrates merely how a signal input from potentiometer 13 in the hand grip governs the actuator lever 44a of the power output or actuator unit 37a through an amplifier 34a and follow-up potentiometer 35a and servomotor 43a. As mentioned above, actuator lever 44a, in turn, performs the operation desired, which, in my case, may be the operation of a control surface or aileron 45a.

The closed loop control system, trim servomotor 43a includes an amplifier 34a of the vacuum tube, magnetic, transistor, or combination type powering a linear actuator with a potentiometer follow-up 35a to form a closed loop. Fig. 7 illustrates in simplified form a preferred closed loop system. Likewise, besides the servomotor 43b, actuator lever 44b, and elevator 45b being controlled by stick 12, potentiometer 14 governs the actuator lever 44b of the actuator unit 37b through amplifier 34b and follow-up potentiometer 35b. It is further noted that both potentiometers 13 and 14 are linked to the electrical control system, where any variation in knob setting is reflected by a proportional actuation of an actuator lever with its resultant change in control surface attitudes or trim settings.

An advantage of this potentiometer control system over the old beep system as disclosed in the foregoing mentioned U. S. Patents 2,543,450 and also in 2,464,629 is that the output motors are always synchronized with each other. Because each motor moves an exact and equal amount from a reference point, each motor accordingly may be returned to that reference point. Further, when the pilot moves the thumb knob control 15, for example, in the stick 12 very slowly, the auxiliary servomotor 43a of the actuator unit 37a is driven very slowly to keep the voltage of the follow-up potentiometer 35a just balancing out the input voltage of potentiometer 13. When the pilot moves the input control 13 very fast, servomotor 43a of the the actuator unit 37a, runs very fast. Thus the series trim system can have a high maximum speed without affecting its precise positioning ability.

In operation, the actuator unit 37a with the actuator lever 44a, in addition to being controlled by transverse movement of the major control lever 12, is also controlled or governed by an input signal from potentiometer 13 through electrical connection 31, the strength of the input signal being governed by rotation of the auxiliary control wheel knob 15 by transverse movement of the operator's thumb. Accordingly, a fine vernier auxiliary control for roll trim is provided by thumb operated wheel knob 15. Likewise, a separate actuator unit or power source similar to 37, in addition to being controlled by forward and rearward movement of the major control lever 12, may also be provided to be controlled or governed by the input signal from potentiometer 14 through electrical connection 32, the strength of the input signal being adjusted by rotation of the auxiliary control wheel knob 16 in its vertical plane by movement of the operator's thumb. Similarly, a fine vernier auxiliary control for pitch trim is provided by thumb operated wheel knob 16. Both thumb wheel knobs being contiguous with the major control lever, are accordingly conveniently located and easily lend themselves to adjustment by simple thumb movement.

A fool-proof feature of operation and novel characteristic of my auxiliary hand grip device is that the thumb wheels are required to be rotated only in the general direction of desired movement of the major control lever. In aircraft, this is the direction of intended movement of the airplane, i. e., to actuate the actuator lever 44a of roll control actuator unit 37a which is normally operated by transverse movement of the major lever 12 to the right, for example, mere transverse right hand movement of the operator's thumb on the auxiliary roll control thumb knob 15 is necessary. Likewise, to actuate the pitch control actuator, which is normally operated by forward or rearward movement of the major control lever 12 in its vertical plane, mere rotation of the auxiliary pitch control wheel knob 16 in its vertical plane in the same direction of movement of the control lever is necessary by forward or rearward movement of the operator's thumb on the auxiliary pitch control wheel thumb knob.

Various combinations of connections between the input potentiometer as potentiometer 13 for example, and the actuator units having auxiliary fine control servomotors for actuating an actuator lever in each unit may be utilized to obtain the desired manner of control. In one form each input potentiometer may govern or control a different set of actuator units. For example, the signals from one input potentiometer may govern a pair of actuator units symmetrically, i. e., with a particular signal input, the actuator lever of one actuator unit moves in the same direction as the lever of the other unit, and the signals from a second input potentiometer may govern another pair of actuator units asymmetrically, i. e., with a particular signal input, the lever of each actuator unit moves in the direction opposite to the other. In another form, a single set of actuator units may be governed by both input potentiometers so that the said single set of actuator units performs the same function as the above described two sets of actuator units. In this form, the signals from both input potentiometers are superimposed on the same pair of output actuator units, i. e., the signal received in one actuator unit from one potentiometer is mixed or added to the signal received from the other potentiometer, and in the other actuator unit the signals from both potentiometers are similarly mixed or added. If desirable in some installations, the linearity of the potentiometers can be distorted by resistive loading to provide less sensitive control over regions of the trim range of high surface effectiveness.

Each knob serves to govern an individual aircraft control surface or pair or surfaces by manipulation of the particular trim knob. For example, the craft may be made to climb or dive and will continue to climb or dive at an angle corresponding to the setting of the pitch trim knob until the latter is returned to a central neutral position. A single roll control knob is provided whereby the craft may be made to rotate at any desired rate. Furthermore, for a climbing or diving turn, the correct angle of bank as well as the necessary amount of elevator trim for that maneuver may be simultaneously introduced upon operation of the roll and pitch control knobs.

From the above description, the present device deals with a novel and convenient control unit intended for incorporation in a control lever, including thumb-kobs and potentiometers, adjustment of which may be made in initiating and controlling desired fine reactions in the power output being governed without moving the control lever.

This auxiliary control hand grip provides a potentiometer control system that is superior to the old auxiliary mechanical hand wheel or lever system as well as the conventional electric control systems for the reason that increased reliability and life of the components exceed all others we know of in use. Further, the resultant auxiliary installation is approximately one third lighter than the electrical beep or switch type control system described heretofore which is replaced. Rate of movement of the actuators and positioning accuracy, regardless of length of stroke, are greatly increased due to our new servo hand grip device.

While the auxiliary control hand grip is sealed at the bottom with a suitable potting compound, 30, Fig. 3, to exclude dust, moisture, and other injurious media, and for cockpit pressurization, the potentiometers are replaceable.

While only one embodiment of the invention has been shown in the accompanying drawings, it will be evident that various modifications are possible in the arrangement and construction of the various components of the mechanism without departing from the scope of the invention.

What I claim as new and useful and desire to secure by Letters Patent is:

1. An auxiliary control hand grip for a manually operable lever mechanism and actuator unit means operable by said manually operable lever mechanism comprising, a housing mounted on the manually operable lever mechanism, potentiometer actuating means in said housing for governing said actuator unit means independently of said manually operable lever mechanism, and a thumb operated rotatable wheel knob means for said potentiometer actuating means whereby rotational movement by the operator of said thumb operated wheel knob means provides fine control of said actuator unit means.

2. An auxiliary control hand grip for a manually operable lever mechanism and a plurality of actuator units connected to and operable by said manually operable lever mechanism comprising, a housing mounted on the manually operable lever mechanism, a pair of operating means in said housing for governing said actuator units independently of the manually operable lever mechanism to a more precise extent than the control of said manually operable lever mechanism, and a thumb operated rotatable wheel means for each operating means, the plane of one of said wheel means being at an angle to the plane of the other of said wheel means whereby actuation of each thumb operated rotatable wheel means provides fine control of its corresponding actuator unit.

3. An auxiliary control hand grip device as set forth in claim 2 wherein each of said operating means for governing an actuator unit comprises a potentiometer.

4. An auxiliary control hand grip for a manually operable lever means wherein a power source is controlled by the manually operable lever means comprising, a housing means mounted on the manually operable lever means, potentiometer means in said housing means, said potentiometer means governing the power source to a more precise extent than the control of the manually operable lever means, and a thumb operated wheel knob means connected to said potentiometer means whereby rotational movement by the operator of said thumb operated wheel knob means provides an independent and fine control of said power source.

5. An auxiliary control hand grip for a manually operable lever mechanism and actuating units controlled by said lever mechanism which is operatively connected to the actuator units comprising, an elongated housing mounted on the manually operable lever mechanism, a pair of electrical means mounted in said housing, said electrical means governing said actuating units to a more precise degree than the control of said manually operable lever mechanism, and a thumb operated wheel knob operatively connected to each of said electrical means, the plane of one wheel knob being at an angle to the plane of the other wheel knob, whereby rotational movement by the operator of said thumb operated wheel knobs provides fine control of said pair of actuating units.

6. An auxiliary control hand grip for a manually operable lever mechanism and two power sources governed by said lever mechanism which is operatively connected to said two power sources comprising, an elongated housing contiguous with the manually operable lever mechanism, a pair of potentiometers mounted in said housing and each connected to a power source for governing thereof to a more precise extent than the control of the manually operable lever mechanism, a shaft connected to each potentiometer, and a thumb operated wheel knob mounted on each of said shafts, one of said shafts being positioned substantially parallel to the longitudinal axis of the hand grip and the other shaft being positioned substantially transversely of the longitudinal axis of the hand grip, whereby rotational movement by the operator of said thumb operated wheel knobs provides fine control of said two power sources.

7. An auxiliary control hand grip for a manually operable lever mechanism which controls the actuation of a pair of actuator units which are operatively connected to the manually operable lever mechanism comprising, an elongated housing mounted on the manually operable lever mechanism, a pair of electrical means mounted in said housing, the actuator units being governed by said electrical means to a more precise extent than the control of the manually operable lever mechanism, and a thumb operated wheel knob in said housing operatively connected to each of said electrical means, one of said wheel knobs being rotatable in a plane normal to the longitudinal axis of the hand grip and the other wheel knob being rotatable in a plane parallel to the longitudinal axis of the hand grip, whereby rotational movement by the operator of said thumb operated wheel knobs provides fine control of said pair of actuator units.

8. An auxiliary control hand grip for a manually operable lever mechanism which operates a multiplicity of actuator levers which are operatively connected to the manually operable lever mechanism comprising, a housing mounted on the manually operable lever mechanism, a multiplicity of potentiometer means mounted in said housing, said actuator levers being governed by said potentiometer means to a more precise extent than the control of the lever mechanism, and a thumb operated wheel knob operatively connected to each of said potentiometer means, one of said wheel knobs being rotatable in a plane normal to the longitudinal axis of the hand grip and the other wheel knob being rotatable in a plane parallel to the longitudinal axis of the hand grip, whereby rotational movement by the operator of said thumb operated wheel knobs provides fine control of said actuator levers.

9. An auxiliary hollow control hand grip for a manually operable lever mechanism which governs the actuation of a pair of actuator levers which are operatively connected to the manually operable lever mechanism comprising, an elongated housing mounted on the manually operable lever, the bottom of said housing being sealed in an airtight manner, a pair of potentiometers mounted in said housing and connected to a pair of follow-up potentiometers connected to a pair of servomotors which are connected to said pair of actuator levers, said actuator levers being governed by said pair of potentiometers to a more precise extent than the control of the manually operable lever mechanism, a shaft connected to each potentiometer, and a thumb operated wheel knob mounted on each of said shafts, one of said shafts being positioned substantially parallel to the longitudinal axis of the hand grip and the other shaft being positioned substantially transversly of the longitudinal axis of the hand grip, whereby rotational movement by the operator of said thumb operated wheel knobs provides fine control of said pair of actuator levers.

References Cited in the file of this patent

UNITED STATES PATENTS

| | | |
|---|---|---|
| 1,909,182 | Lanagan | May 6, 1933 |
| 1,987,066 | Kingston | Jan. 8, 1935 |
| 2,464,629 | Young | Mar. 15, 1949 |
| 2,543,450 | Feagin | Feb. 27, 1951 |
| 2,659,554 | Murphy | Nov. 17, 1953 |